United States Patent Office 3,402,213
Patented Sept. 17, 1968

3,402,213
ALKYLATION PROCESS
Armand J. De Rosset, Clarendon Hills, Ill., assignor to Universal Oil Products Company, Des Plaines, Ill., a corporation of Delaware
No Drawing. Filed Aug. 30, 1966, Ser. No. 575,946
10 Claims. (Cl. 260—671)

ABSTRACT OF THE DISCLOSURE

A process for the alkylation of aromatic compounds with olefin-acting compounds using a catalyst comprised of a refractory inorganic oxide chemically combined with a metal subfluoride is disclosed.

---

This invention relates to a conversion process for the alkylation of alkylatable aromatic compounds into more useful compounds. More specifically, this invention is concerned with a conversion process for the alkylation of an alkylatable aromatic compound with an olefin acting compound utilizing a novel catalyst comprising a refractory inorganic oxide chemically combined with a metal subfluoride vapor.

It is therefore an object of this invention to provide a process for the alkylation of alkylatable aromatic compounds utilizing a novel alkylation catalyst.

A specific object of this invention is to provide a novel method and a novel catalyst for alkylating alkylatable aromatic compounds to provide the desired alkylated product in high yields.

One embodiment of the invention relates to a conversion process which comprises alkylating an alkylatable aromatic compound at a temperature in the range of from about 0° to about 450° C. and a pressure in the range of from about atmospheric to about 200 atmospheres in contact with a catalyst comprising a refractory inorganic oxide chemically combined with a metal subfluoride vapor.

Other objects and embodiments referring to alternative alkylatable aromatic compounds and to alternative catalytic compositions of matter will be found in the following further detailed description of the invention.

The process of my invention is applicable to the alkylation of alklatable aromatic compounds including, for example, benzene, toluene, ortho-xylene, meta-xylene, para-xylene, ethylbenzene, ortho-ethyltoluene, meta-ethyltoluene, para-ethyltoluene, 1,2,3-trimethylbenzene, 1,2,4-trimethylbenzene, 1,3,5-trimethylbenzene, diethylbenzene, triethylbenzene, normal propylbenzene, isopropylbenzene, etc. and mixtures thereof. Preferred alkylatable aromatic compounds are the monocyclic aromatic hydrocarbons, that is, the benzene hydrocarbons. Higher molecular weight alkyl aromatic hydrocarbons are also suitable. These include those aromatic hydrocarbons such as are produced by the alkylation of aromatic hydrocarbons with olefin polymers and are used as intermediates in the preparation of sulfonate surface-active agents. Such products are frequently referred to in the art as alkylate, and include hexylbenzenes, nonylbenzenes, dodecylbenzenes, pentadecylbenzenes, hexyltoluenes, nonyltoluenes, dodecyltoluenes, pentadecyltoluenes, etc. Very often, alkylate is obtained as a high boiling fraction in which the alkyl group attached to the aromatic nucleus varies in size from about $C_9$ to $C_{13}$. Other suitable aromatic hydrocarbons, which at specified conditions, depending upon the melting point of the aromatic chosen, would be in liquid form, would include those aromatic hydrocarbons with two or more aryl groups such as diphenyl, diphenylmethane, triphenyl, triphenylmethane, fluorene, stilbene, etc. Examples of other aromatic hydrocarbons utilizable within the scope of this invention which at specified alkylation conditions, depending upon melting point of the aromatic chosen, would be in liquid form, include those containing condensed aromatic rings. These include naphthalene, alkyl naphthalenes, anthracene, phenanthrene, naphthacene, rubrene, etc. Of the above-metnioned aromatic hydrocarbons that could be utilized in the process of this invention, the benzene hydrocarbons are preferred, and of the preferred benzene hydrocarbons, benzene itself is particularly preferred.

The olefin-acting compound, acting as the alkylating agent, may be selected from diverse materials including mono-olefins, diolefins, polyolefins, acetylenic hydrocarbons, and also alcohols, ethers, and esters, the latter including alkyl halides, alkyl sulfates, alkyl phosphates, and various esters of carboxylic acids. The preferred olefin-acting compounds are olefinic hydrocarbons which comprise monoolefins containing one double bond per molecule and polyolefins which contain more than one double bond per molecule. Monoolefins which are utilized as olefin-acting compounds in the process of the present invention are either normally gaseous or normally liquid and include ethylene, propylene, 1-butene, 2-butene, isobutylene, and higher molecular weight normally liquid olefins such as the various pentenes, hexenes, heptenes, octenes, and mixtures thereof, and still higher molecular weight liquid olefins, the latter including various olefin polymers having from about 9 to about 18 carbon atoms per molecule including propylene trimer, propylene tetramer, propylene pentamer, etc. Cycloolefins such as cyclopentene, methylcyclopentene, cyclohexene, methylcyclohexene, etc. may also be utilized. Also included within the scope of the olefin-acting compound are certain substances capable of producing olefinic hydrocarbons or intermediates thereof under the conditions of operation utilized in the process. Typical olefin-producing substances or olefin-acting compounds capable of use include alkyl halides capable of undergoing dehydrohalogenation to form olefinic hydrocarbons and thus containing at least two carbon atoms per molecule. Examples of such alkyl halides include ethyl fluoride, n-propyl fluoride, tertbutyl fluoride, etc., ethyl chloride, n-propyl chloride, isopropyl chloride, n-butyl chloride, isobutyl chloride, secbutyl chloride, tert-butyl chloride, etc., ethyl bromide, n-propyl bromide, isopropyl bromide, n-butyl bromide, isobutyl bromide, sec-butyl bromide, tert-butyl bromide, etc. As stated hereinabove, other esters such as alkyl sulfates including ethyl sulfate, propyl sulfate, etc., and alkyl phosphates including ethyl phosphates, etc. may also be utilized. Ethers such as diethyl ether, ethyl propyl ether, dipropyl ether, etc., are also included within the generally broad scope of the term olefin-acting compound and may be successfully utilized as alkylating agents in the process of this invention.

In addition, the process of this invention may be successfully applied to and utilized for complete conversion of olefin hydrocarbons when these olefin hydrocarbons are present in minor quantities in various gas streams. Thus, the normally gaseous olefin for use in the process of this invention need not be concentrated. Such normally gaseous olefin hydrocarbons appear in minor quantities in various refinery gas streams, usually diluted with gases such as hydrogen, nitrogen, methane, ethane, propane, etc. These gas streams containing minor quantities of olefin hydrocarbons are obtained in petroleum refineries from various refinery installations including thermal cracking units, catalytic cracking units, thermal reforming units, coking units, polymerization units, dehydrogenation units, etc. Such refinery gas streams have in the past often been burned for fuel value, since an economical process for the utilization of their olefin hydrocarbon content has not been available. This is particularly true for refinery gas streams known as off-gas streams containing relatively minor quantities of olefin hydrocarbons such as ethylene, propylene, etc.

As hereinbefore set forth, the invention is concerned with a process for the alkylation of alkylatable aromatic compounds, said process being effected in the presence of a catalyst which possesses a high degree of hydrocarbon conversion activity and is particularly effective as an alkylation catalyst for alkylatable aromatic compounds, a representative number of which are hereinabove set forth. The catalyst comprises a refractory inorganic oxide chemically combined with a metal subfluoride vapor. Satisfactory refractory oxides for the preparation of catalysts for use in the process of this invention include high surface area crystalline alumina modifications such as gamma-, eta- and theta-alumina, although these are not necessarily of equivalent suitability. By the term high surface area is meant a surface area measured by surface adsorption techniques within the range of from about 25 to about 500 or more square meters per gram and preferably a surface area of approximately 100 to 300 square meters per gram. In addition to the aforementioned gamma-, eta- and theta-aluminas which may be utilized as solid supports, it is also contemplated that other refractory oxides such as silica, zirconia, magnesia, thoria, etc., and combinations of refractory oxides such as silica-alumina, silica-magnesia, alumina-silica-magnesia, alumina-thoria, alumina-zirconia, etc., may also be utilized as solid supports for the catalyst of the present invention.

As set forth hereinabove, the catalyst comprises a refractory inorganic oxide that is combined with a metal subfluoride vapor to effect chemical combination of the refractory inorganic oxide with said metal subfluoride vapor. Particularly preferred metal subfluorides include the aluminum subfluorides including aluminum monofluoride and silicon subfluorides including silicon difluoride due mainly to the relative ease in preparing these compounds although the invention is not restricted to their use, but may employ any of the known metal subfluorides insofar as they are adaptable. However, it is not intended to infer that different metal subfluorides which may be employed will produce catalysts which have identical effects upon any given organic reaction as each of the catalysts produced from different metal subfluorides and by slightly varying procedures will exert its own characteristic action.

It is a feature of the present invention that the finished catalyst of the present invention prepared as hereinafter set forth has increased structural strength and a high degree of stability due to the immobility of the components of the finished catalysts inasmuch as chemical combination of the refractory inorganic oxide with the metal subfluoride vapor is accomplished as hereinafter described.

The catalyst of the present invention comprises a metal subfluoride vapor chemically combined with the refractory inorganic oxide so as to effect chemical combination of the refractory inorganic oxide with the metal subfluoride vapor, and as hereinbefore set forth, it is the particular association of these components which results in the unusual catalytic properties of this catalyst. The metal subfluoride vapor may be chemically combined with the refractory inorganic oxide at temperatures in the range of 650° C. to about 1200° C. and at a pressure of from about subatmospheric to about 7 atmospheres. The formation of the metal subfluoride vapor, and especially the formation of aluminum monofluoride is accomplished by sweeping with a gas such as helium, argon or hydrogen, and preferably helium, a stoichiometric mixture of aluminum metal (melting point about 660° C.) and aluminum trifluoride (melting point greater than 1000° C.) which is heated to about 750 to 800° C. The refractory inorganic oxide which is then chemically combined with the aluminum monofluoride is placed in the downstream helium flow. The chemical combination takes place at temperatures in excess of 650° C. Fluoride concentrations of between 0.01 percent to about 5 percent (by weight) are preferred.

In an alternative method, the catalyst may be prepared by pelleting a mixture of aluminum powder with a stoichiometric excess of aluminum trifluoride, and mixing these pellets with the refractory inorganic oxide catalyst support and then heating in vacuum in a furnace tube at elevated temperatures.

The process of this invention utilizing the catalyst hereinbefore set forth may be effected in any suitable manner and may comprise either a batch or a continuous type operation. The preferred method by which the process of this invention may be effected is a continuous type operation. One particular method is the fixed bed operation in which the alkylatable aromatic compound and the olefin-acting compound are continuously charged to a reaction zone containing a fixed bed of the desired catalyst, said zone being maintained at the proper operating conditions of temperature and pressure, that is, a temperature in the range of from about 0° to about 450° C. or more and a pressure including a pressure of from about atmospheric to about 200 atmospheres or more. The catalyst is suitable for either gas phase or liquid phase reactions so that the liquid hourly space velocity (the volume of charge per volume of catalyst per hour) may be maintained in the reaction zone in the range of from about 0.1 to about 20 or more, preferably in the range of from about 0.1 to about 10, or at a gaseous hourly space velocity in the range of from about 100 to about 1500 or more. The reaction zone may comprise an unpacked vessel or coil or may be lined with an adsorbent packing material. The two reactants may be charged through separate lines or, if so desired, may be admixed prior to entry into said reaction zone and charged thereto in a single stream. This charge passes through the catalyst bed in either an upward or downward flow and the alkylated product is continuously withdrawn, separated from the reactor effluent, and recovered, while any unreacted starting materials may be recycled to form a portion of the feed stock. It is also contemplated within the scope of this invention that reaction gases such as nitrogen, argon, hydrogen, helium, etc., may also be charged to the reaction zone if desired. Another continuous type operation comprises the moving bed type in which the reactants and the catalyst bed move either concurrently or countercurrently to each other while passing through said reaction zone.

Still another type of operation which may be used is the batch type operation in which a quantity of the alkylatable aromatic hydrocarbon, the olefin-acting compound and the catalyst are placed in an appropriate apparatus such as, for example, a rotating or stirred autoclave. The apparatus is then heated to the desired temperature and maintained thereat for a predetermined residence time at the end of which time the flask and contents thereof are cooled to room temperature and the desired reaction product is recovered by conventional means, such as, for example, by washing, drying, fractional distillation, crystallization, etc.

The following examples are given to illustrate the process of the present invention which, however, are not intended to limit the generally broad scope of the present invention in strict accordance therewith.

EXAMPLE I

A quartz vessel with provisions for connection to a vacuum system was filled with a mixture of about 50 grams of $\frac{1}{16}$ inch alumina spheres and about 10 grams of ⅛ inch pellets comprising about 20% aluminum metal and about 80% aluminum monofluoride by weight. The contents of the vessel were outgassed at a pressure of less than $10^{-4}$ mm. while slowly being heated in a tube furnace. Approximately 4 hours were allowed for the system to reach 600 to about 650° C. The evacuated vessel was then sealed off. The vessel was then placed in a muffle furnace at 750° C. for 1 hour and rotated slowly to aid mixing.

The sealed vessel was cooled to room temperature. After cooling, the vessel was opened in a helium dry box, the catalyst spheres were separated from the pellets and the catalyst was then placed in vessels which were then sealed. A fluoride level of about 3.2 weight percent was achieved. This catalyst was designated as catalyst A.

EXAMPLE II

In this example, a volatile fluoride (800° C.) was prepared by sweeping with helium a stoichiometric mixture of aluminum metal (melting point 660° C.) and aluminum trifluoride (melting point greater than 1000° C.) which was heated to 750–800° C. Aluminum monofluoride was then produced. A catalyst base in the form of 1/16 inch alumina spheres was then placed in the downstream helium flow and the aluminum monofluoride was chemically combined with the alumina base at a temperature in excess of 650° C.

The catalyst produced by this vapor deposition and chemical combination of the aluminum monofluoride with the alumina had fluoride levels of between 0.01 and 1.1 percent by weight of fluoride chemically combined therewith. This catalyst was designated as catalyst B.

EXAMPLE III

The catalyst prepared according to Example I above and designated as catalyst A is utilized in an alkylation reaction to determine the alkylation activity of said catalyst. In this experiment, a portion of the catalyst prepared according to the method of Example I is placed in an appropriate apparatus which is provided with heating means. In the experiment, benzene and ethylene are charged separately to the alkylation reaction zone. The reactor is maintained at about 500 p.s.i.g. and 125° C. Substantial conversion of the ethylene is obtained. The product is analyzed for olefins using a mass spectrometer and it is found that the product comprises ethylbenzene, diethylbenzene, polyethylbenzenes and unreacted benzene.

EXAMPLE IV

The catalyst prepared according to Example II and designated as catalyst B is utilized in the alkylation reaction zone, a portion of the finished catalyst being placed in the alkylation apparatus. In the experiment, benzene and ethylene are charged separately to the alkylation zone which is maintained at about 500 p.s.i.g. and 125° C. Based on weight, substantial conversion of the ethylene is obtained. The product is analyzed for olefins using a mass spectrometer and it is found that the product comprises ethylbenzene, diethylbenzene, polyethylbenzenes and unreacted benzene.

EXAMPLE V

The catalyst prepared according to Example I and designated as catalyst A is utilized in an alkylation reaction, a second portion of the finished catalyst being place in the alkylation apparatus. In the experiment, benzene and propylene are charged separately to the alkylation zone. The reactor is maintained at about 400 p.s.i.g. and 175° C. Substantial conversion of the propylene is obtained. The product is analyzed for olefins using a mass spectrometer and it is found that the product comprises cumene, diisopropylbenzene, polypropylbenzenes and unreacted benzene.

EXAMPLE VI

A second portion of catalyst prepared according to Example II above and designated as catalyst B is utilized in an alkylation reaction to determine the alkylation activity of said catalyst. In the experiment, benzene and pentene-1 were charged separately to the alkylation reaction zone. The reactor was maintained at about 450 p.s.i.g. and 150° C. Substantial conversion of the pentene-1 was obtained. The product was analyzed for olefins using a mass spectrometer and it is found that the major product comprised 2-phenylpentane.

EXAMPLE VII

A third portion of the catalyst prepared according to Example I above and designated as catalyst A is utilized in the alkylation of benzene with a synthetic refinery off-gas similar to that normally observed from a catalytic cracking unit. A fresh batch of the catalyst is placed in an alkylation reactor and the reactor is maintained at a temperature in the range of from about 110° C. to about 215° C. at a pressure of about 600 p.s.i.g. The composition of the synthetic off-gas feed is as follows: carbon dioxide, 0.1 mol percent; nitrogen, 29.0 percent; carbon monoxide, 1.3 mol percent; hydrogen, 18.9 mol percent; methane, 35.0 mol percent; ethylene, 12.0 mol percent; ethane, 0.5 mol percent; propylene, 2.5 mol percent; propane, 0.1 percent; isobutane, 0.1 mol percent; and acetylene, 0.5 mol percent. The off-gas and benzene are charged separately to the alkylation zone. The plant liquid effluent is tested for unsaturation and is found to have a low bromine index indicating the substantial absence of olefin polymerization products. The product comprises ethylbenzene, diethylbenzene, polyethylbenzenes, cumene, diisopropylbenzene, polypropylbenzenes and 1,1-diphenylethane.

I claim as my invention:

1. A conversion process which comprises alkylating an alkylatable aromatic compound with an olefin-acting compound at a temperature in the range of from about 0° to about 450° C. and at a pressure in the range of from about atmospheric to about 200 atmospheres in contact with a catalyst comprising a refractory inorganic oxide chemically combined with a metal subfluoride vapor.

2. The process of claim 1 further characterized in that said metal subfluoride is aluminum monofluoride.

3. The process of claim 2 further characterized in that said refractory inorganic oxide comprises alumina.

4. The process of claim 2 further characterized in that said refractory inorganic oxide comprises silica-alumina.

5. The process of claim 4 further characterized in that said alkylatable aromatic compound is an alkylatable benzene hydrocarbon.

6. The process of claim 4 further characterized in that said alkylatable aromatic compound is benzene.

7. The process of claim 4 further characterized in that said olefin-acting compound is an olefinic hydrocarbon.

8. The process of claim 4 further characterized in that said olefin-acting compound is a normally gaseous olefin.

9. The process of claim 8 further characterized in that said normally gaseous olefin is ethylene.

10. The process of claim 8 further characterized in that said normally gaseous olefin is propylene.

References Cited

UNITED STATES PATENTS

| | | | |
|---|---|---|---|
| 2,965,686 | 12/1960 | Prill | 260—671 |
| 3,318,821 | 5/1967 | Pollitzer | 260—671 |

DELBERT E. GANTZ, *Primary Examiner.*

CURTIS R. DAVIS, *Assistant Examiner.*